(12) United States Patent
Dehne et al.

(10) Patent No.: US 8,504,195 B2
(45) Date of Patent: Aug. 6, 2013

(54) METHOD AND APPARATUS FOR RADIO-CONTROLLED FRICTION DRIVE CONVEYOR SYSTEM

(75) Inventors: Noel F. Dehne, Novi, MI (US); Christopher John Murphy, Ann Arbor, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 951 days.

(21) Appl. No.: 12/555,073

(22) Filed: Sep. 8, 2009

(65) Prior Publication Data

US 2011/0060452 A1     Mar. 10, 2011

(51) Int. Cl.
*G06F 7/00*     (2006.01)

(52) U.S. Cl.
USPC .......................................... 700/229

(58) Field of Classification Search
USPC ................................. 700/229, 230
See application file for complete search history.

(56) References Cited

U.S. PATENT DOCUMENTS

| | | | |
|---|---|---|---|
| 3,610,363 A | 10/1971 | Hartley | |
| 3,661,093 A | 5/1972 | Searle | |
| 3,835,950 A | 9/1974 | Asano et al. | |
| 3,842,744 A | 10/1974 | Vis | |
| 4,609,922 A | 9/1986 | Boegli et al. | |
| 4,630,216 A | 12/1986 | Tyler et al. | |
| 4,766,547 A | 8/1988 | Modery et al. | |
| 4,926,753 A | 5/1990 | Weiss | |
| 4,955,291 A | 9/1990 | Dillon et al. | |
| 5,012,749 A | 5/1991 | Passage, Jr. | |
| 5,086,910 A | 2/1992 | Terpstra | |
| 5,335,777 A | 8/1994 | Murphy et al. | |
| 6,109,568 A | 8/2000 | Gilbert et al. | |
| 6,218,942 B1 | 4/2001 | Vega et al. | |
| 6,244,421 B1 * | 6/2001 | Hall ........................... 198/460.1 |
| 6,535,777 B1 | 3/2003 | Kohler | |
| 6,681,638 B2 | 1/2004 | Kazerooni et al. | |
| 6,997,303 B2 | 2/2006 | Edwards et al. | |
| 7,063,204 B1 | 6/2006 | Pfeiffer et al. | |
| 7,097,029 B2 | 8/2006 | Halang | |
| 7,123,988 B2 | 10/2006 | Russell et al. | |
| 7,127,997 B2 | 10/2006 | Nishihara et al. | |
| 7,174,836 B2 | 2/2007 | Marino et al. | |
| 7,178,660 B2 | 2/2007 | Dehne et al. | |
| 8,060,245 B2 * | 11/2011 | Lupton et al. .................. 700/230 |
| 2006/0106684 A1 | 5/2006 | Aoki et al. | |
| 2006/0158043 A1 | 7/2006 | Brouwer et al. | |
| 2007/0059144 A1 | 3/2007 | Lowrance et al. | |
| 2007/0106413 A1 | 5/2007 | Russell et al. | |
| 2007/0205859 A1 | 9/2007 | Webster | |
| 2009/0002134 A1 | 1/2009 | McAllister | |
| 2010/0280652 A1 * | 11/2010 | Ong ............................. 700/218 |

FOREIGN PATENT DOCUMENTS

| | | |
|---|---|---|
| EP | 1 557 383 A1 | 7/2005 |
| WO | 02 091091 A1 | 11/2002 |
| WO | 03031290 A2 | 4/2003 |

* cited by examiner

*Primary Examiner* — Ramya Burgess
(74) *Attorney, Agent, or Firm* — Dickinson Wright PLLC

(57) ABSTRACT

A conveyor system having a conveyor path and friction drive spaced along the path to drive carriers along the path. Each friction drive is controlled by a drive controller, which communicates tracking, routing, and other information directly to other drive controllers within range via a wireless signal. The drive controllers may also directly communicate wirelessly with a central controller. If the central controller or a desired destination drive controller is out of range of a particular drive controller, that drive controller may communicate through other drive controllers until the desired destination drive controller is reached, or a drive controller that is within range of the central controller is reached.

22 Claims, 5 Drawing Sheets

| TAG ID | LOCATION | FUNCTION |
|---|---|---|
| TAG 1 | A | STOP |
| TAG 2 | B | DIVERT |
| TAG 3 | C | REVERSE |
| • | • | • |
| • | • | • |
| • | • | • |

METHOD AND APPARATUS FOR RADIO-CONTROLLED FRICTION DRIVE CONVEYOR SYSTEM

BACKGROUND OF THE INVENTION

1. Field of the Invention

The present invention is directed to a material handling system having reduced installation, modification and maintenance costs, and more specifically to a friction drive conveyor system having independent and intelligent drive controllers for controlling friction drive motors, and wherein the drive controllers may communicate routing information and other data wirelessly with each other.

2. Discussion

Material handling systems and installed conveyor systems are used in a variety of manufacturing and material handling settings to move workpieces and other loads from point to point. Each setting and each type of workpiece or load transported may have different requirements and a wide variety of conveyor styles and carrier styles exist to fulfill these requirements.

One commonly used material handling system used in manufacturing settings for transporting workpieces and in some material handling settings for transferring loads is a friction drive conveyor system. Friction drive conveyor systems are capable of handling a variety of workpiece or load sizes, and many are configured to even carry vehicles from point to point in a manufacturing setting. While most friction drive systems include a rail or track from which the workpiece or load carrier hangs from or rides upon, such as the illustrate monorail, some friction drive conveyor systems have been formed without tracks or rails.

While the manufacturing costs for forming the individual components of a friction drive conveyor system, including material costs, may be formidable, one major expense of the final cost is the installation expense. A friction drive conveyor system traditionally includes many drive motors in direct electrical communication with a central controller for controlling the movement of a workpiece carrier, and receiving tracking information. In fact, in many friction drive systems, the system may be configured to have a friction drive motor in contact at all times with each workpiece carrier to control the movement of the workpiece carrier, including stops, accelerations, and routing of the workpiece carrier. This constant contact of at least one friction drive motor ensures constant control of the workpiece carrier in settings where the workpiece carriers may pass along the material handling path with gaps between. However, each friction drive is wired to the central controller creating high installation expenses due to the materials and installation time required.

In new facilities, this installation may be simplified by running the wiring before the floor is installed, typically poured concrete. However, this method makes any future changes to the configuration of the system difficult. In existing facilities, the wiring routes and installation of wiring may be even more expensive and time consuming, requiring use of conduit and wire runs, drilling through floors and other stationary members and ensuring that the wiring is protected from damage. Also, due to the size, configuration and at times the manufacturing operations being performed, it typically is difficult to reliably have each drive controller directly communicate wirelessly regarding sensor information to a central controller and in turn directly receive commands from a central controller. For example, a conveyor path may pass around massive machinery, through tunnels, past operations that interfere with wireless signals, and stretch along its complete length for long distances, all of which negatively effect reliable wireless communication for each drive motor with the central controller. Therefore, until now no system reliably existed which also allowed reduced installation costs by the elimination of wired controls between the central controller and each drive motor.

SUMMARY OF THE INVENTION AND ADVANTAGES

The present invention is directed to a material handling system having reduced installation, modification and maintenance costs, and more specifically to a friction drive conveyor system having independent and intelligent drive controllers for controlling friction drive motors, and wherein the drive controllers may communicate routing information and other data wirelessly with each other.

The present invention is further directed to a friction drive conveyor system having a conveyor path; a first friction drive in electrical communication with a first drive controller; and a second friction drive in electrical communication with a second drive controller and wherein the first and second drive controllers are in wireless communication. The friction drive conveyor system may include a central controller and the first and second drive controllers may be in wireless communication with the central controller. The wireless drive controllers also may communicate through each other, such that the first drive controller is in direct wireless communication with the central controller and the second drive controller is not in direct wireless communication with the central controller. The friction drive system may include additional drive controllers and repeaters and some of the drive controllers may only communicate through the repeaters with other drive controllers.

The system may include sensors in communication with the drive controllers. The sensors may be tag readers wherein each workpiece carrier may include a unique tag having certain information related to routing and manufacturing. The sensor may be capable of reading data on the tag and writing new data to the tag.

The present invention is further directed to a friction drive conveyor system having a conveyor path; a first friction drive in electrical communication with a first drive controller on the conveyor path; a second friction drive in electrical communication with a second drive controller on the conveyor path; and a plurality of intervening friction drives and a plurality of associated intervening drive controllers and wherein the first and second drive controllers are in wireless communication with the plurality of wireless controllers and the first and second drive controllers are only in communication with each other through the plurality of intervening drive controllers.

The present invention may be further directed to a method of controlling movement of workpiece carriers on a friction drive conveyor system having a plurality of friction drives spaced along a conveyor path and a plurality of drive controllers each associated with one or more of the friction drives and wherein the drive controllers are capable of wireless communication with each other, the method comprising the steps of: receiving information related to a workpiece with a first drive controller; determining a control strategy with the first drive controller; outputting a signal consistent with the determined control strategy to the relevant drive motors controlled by the first drive controller; and wirelessly passing information regarding the received information related to a workpiece to a second drive controller.

The method may further include the step of sensing the workpiece carrier location with a sensor in communication with the second drive controller; and initiating control of the workpiece carrier with the second drive controller.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
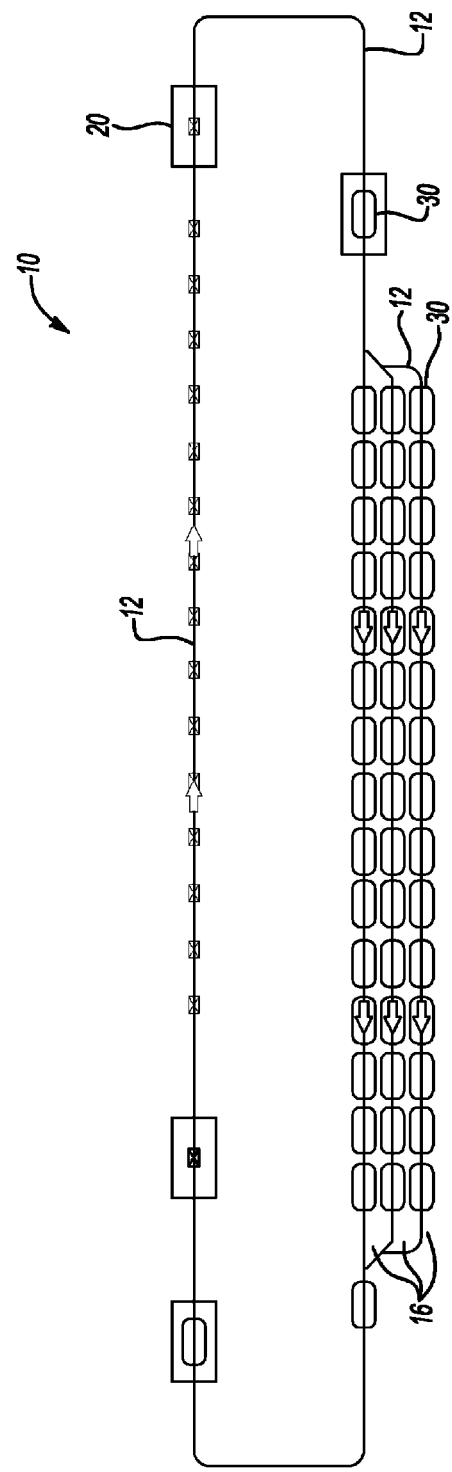
FIG. 1 is a schematic diagram top view of an exemplary friction drive conveyor system.

An exemplary material handling system 10 is illustrated in FIG. 1. Of course, the illustrated system 10 is only exemplary and material handling systems easily vary depending upon the desired configurations, path, styles, manufacturing operations, and workpieces being transported. As illustrated in FIG. 1, the system generally extends along a conveyor path 12. Various carriers 20 may travel along this path 12 transporting loads or workpieces 30.

Figure 2:
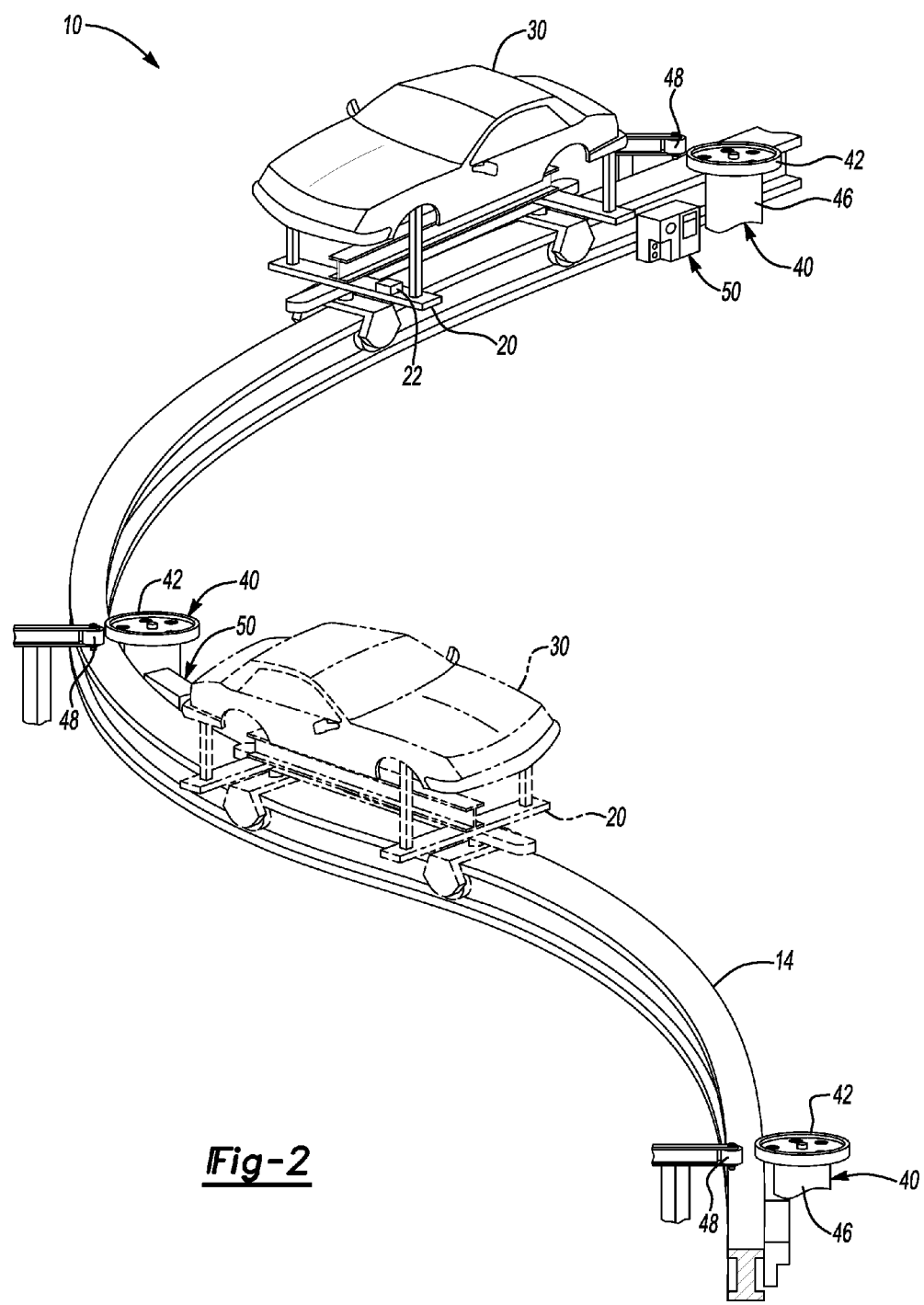
FIG. 2 is a perspective view of an exemplary friction drive conveyor system.

The present invention is particularly useful for friction drive conveyor systems, which hereinafter shall be the referenced system 10. As illustrated in FIG. 2, friction drive systems 10 typically include a rail or track forming the conveyor path 12, such as the illustrated monorail 14. Spaced along the rail 14 are various friction drives 40 and associated drive controllers 50. The friction drives 40 control movement of the carrier 20 along the rail 14. Although FIG. 2 only illustrates three friction drives 40 spaced a distance apart, one or more friction drives may be configured to be between the illustrated drives 40, such that the carrier 20 is always in contact with at least one drive 40 as it moves along the path 12. Likewise, the same control may be maintained by using groups of carriers with less drive motors 40, such that at least one drive motor 40 is in contact with the group of carriers (not illustrated) at all times, giving the system the ability to control the motion (stop/start/forward/reverse) as well as the speed and routing.

Figure 3:
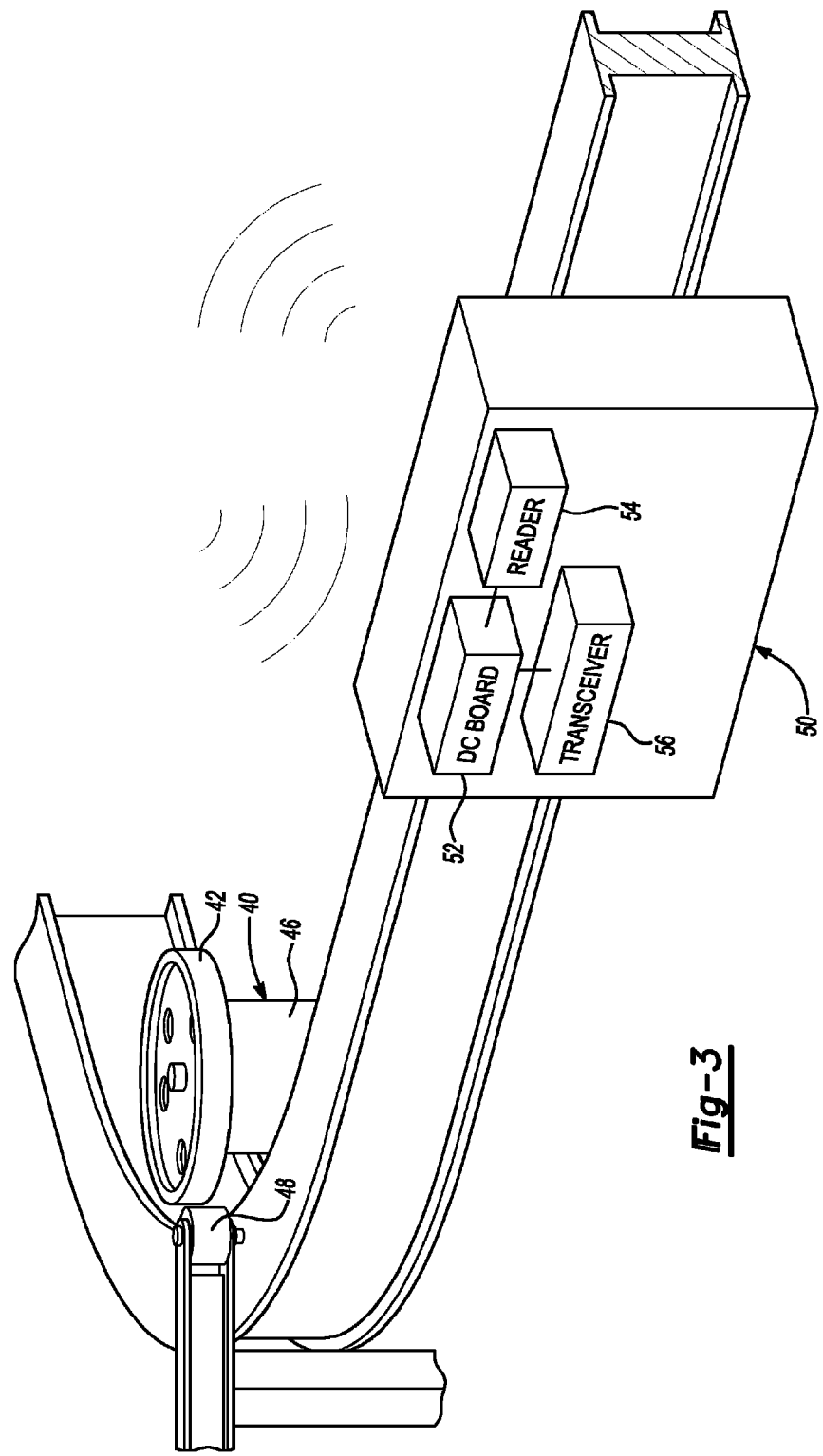
FIG. 3 is an enlarged perspective view of a friction drive motor and associated drive controller.

The friction drives 40 generally include a friction drive wheel 42 driven by a motor 46. As illustrated in FIGS. 2 and 3, the friction drives 40 may include an opposing idler roller 48 to assist the friction drive wheel 42 in maintaining sufficient friction engagement with the carrier 20. Each friction drive 40 is controlled by a drive controller 50.

Figure 4:
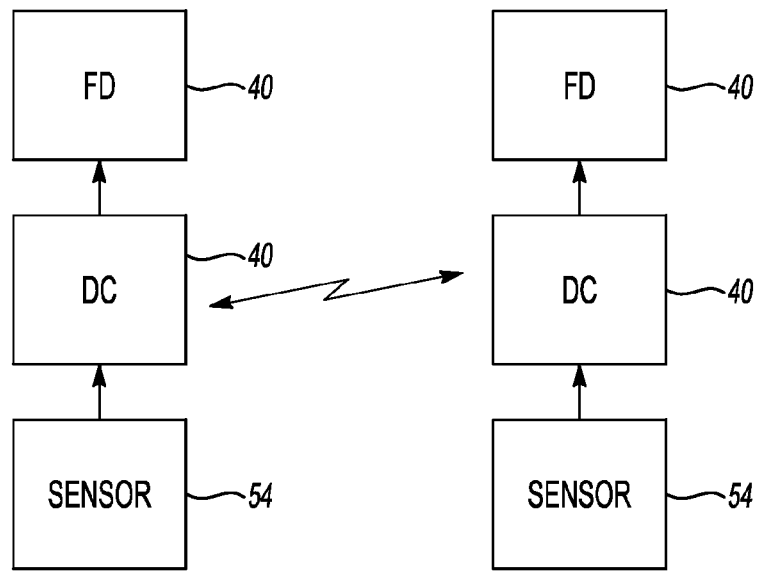
FIG. 4 is a schematic view of two drive controllers in wireless communication.
Figure 5:
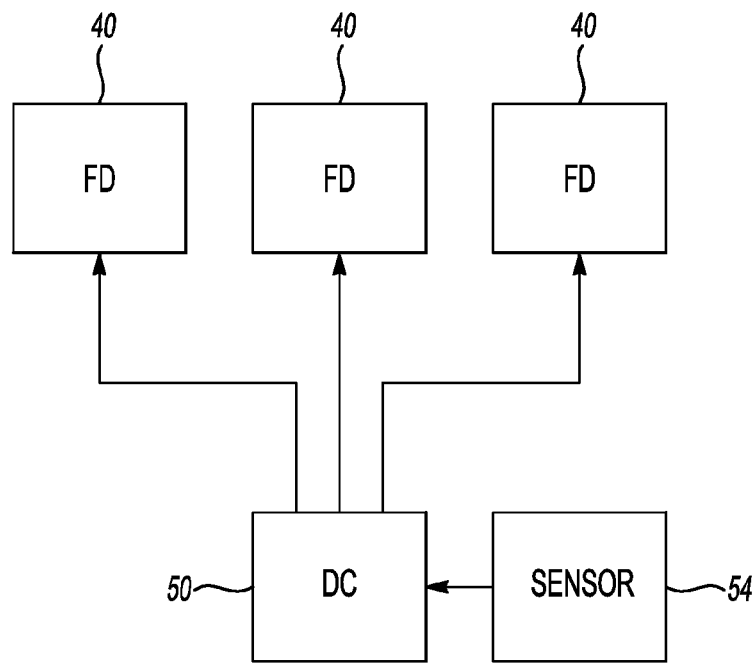
FIG. 5 is a schematic view of a drive controller in communication with multiple drive motors.
Figures 6, 7:
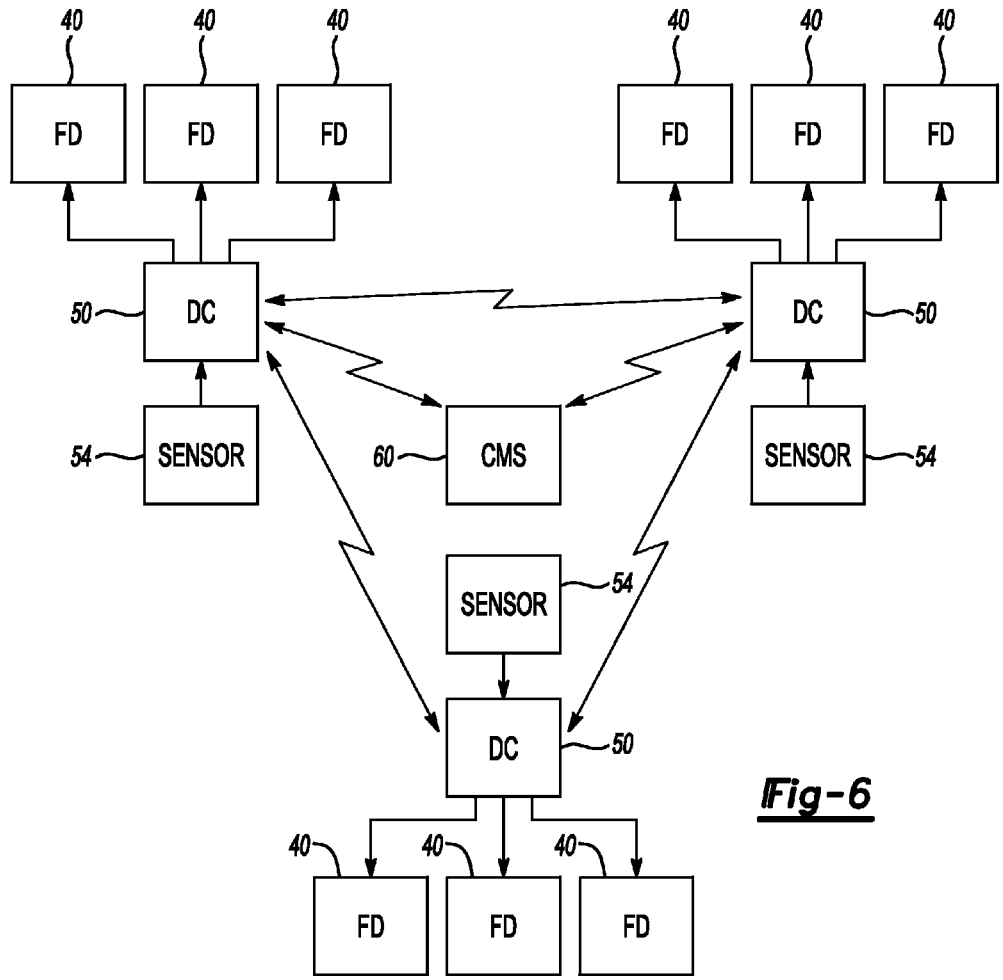
FIG. 6 is a schematic view of two drive controllers in wireless communication with each other and in wireless communication with a central controller.
FIG. 7 is a diagram of an exemplary load record.

The drive controller 50 is configured to control the friction drives 40, and given the typical proximity is hardwired to the friction drive 40. While each drive controller 50 may be paired with a single friction drive 40, as illustrated in FIGS. 2-4, in some instances each drive controller 50 may control multiple friction drives 40, as illustrated in FIGS. 5 and 6. Each drive controller 50 includes the ability to communicate wirelessly with at least one other drive controller 50, such as by the exemplary illustrated transceiver 56. Any form of wireless communication may be used, however, given the close proximity of drive controllers, wireless communication may reliably occur between drive controllers 50 using low power and inexpensive communication devices (illustrated as transceiver 56). The wireless communication may be a radio signal, infrared signal or any other wireless signal.

Each drive controller 50 may also be in communication with one or more sensors 54, which may read tags 22 on each carrier 20. The sensors 54 allow the drive controllers 50 to obtain location information and directly or indirectly and pass such information along and if part of the system 10, update a central controller 60 as well as use the tags for routing, and sending location information for the performance of manufacturing operations (not illustrated). Some systems may include RFID tags or other style tags on the carrier 20. The sensors 54 may read information from the tag and supply it to various associated manufacturing machines or even use the information to provide routing instructions. For example, the workpiece on a carrier 20 may be a vehicle that is being assembled. The tag 22 may include data that the sensor 54 reads regarding optional steps that need to be performed, such as this vehicle receives an optional spoiler, or that this vehicle should be painted blue in the paint booth. As the sensor 54 is in communication with the drive controller 50 which includes wireless capabilities, the drive controller may communicate wirelessly with the various associated manufacturing machines to save wiring costs and allow for easy installation of the system. In addition, the sensor 54 may be able to write data to the RFID tag or other style tag to create a manufacturing record which may be used to determine if a workpiece may need to be reworked, used in tracking other issues, or used as a manufacturing record such as information to fix a problem found in warranty claims later in the product cycle. For example, the manufacturing machines may provide the exact torque of every screw added to the workpiece, to the drive controller 50, which provides it to the sensor 54, which writes it to the tag 22.

During operation, the carrier 20 travels down the path 12, driven by various friction drives 40. At the start of travel or initiation of the sequence, such as the start of a manufacturing process, typically the first drive controller receives information about the carrier 20. The first drive controller may communicate with the central controller 60 regarding various helpful data. For example, the drive controller 50 may provide a unique carrier identification read from the tag 22 by the sensor 54 to other drive controllers and if included, to a central controller. The central controller 60 in turn may provide to the drive controller routing and control information to be associated with that particular carrier 20.

As the carrier 20 passes down conveyor path 12, each drive controller 50 may pass relevant information to the subsequent downstream drive controller 50 without the need for the individual drive controllers 50 to communicate with the central controller 60. The drive controllers 50 also pass this information wirelessly to each other. This eliminates the need for drive controllers 50 to each be individually hardwired to the central controller 60 or to each other. Instead, communication between the central controller 60 and a distant drive controller 50, even if it is out of range, or between two out-of-range drive controllers, may occur wirelessly with intervening drive controllers forwarding the information until it reaches the desired drive controller. For example, if one of the subpaths 16 has a problem, the controller 60 or a drive controller may communicate such information and provide a solution of how to go around the problem or fix the problem. While the communication may occur linearly through sequential drive controllers, it is expected that any drive controller may forward information to or from the central controller or to or from other drive controllers, until the information reaches the central controller or the desired drive controller. Therefore, the drive controllers 50 form a mesh network, with each controller capable of communicating with every other controller in wireless range. It also should be noted that the system could be implemented without central controller 60, however, it is expected that central controller 60 could provide a higher level of tracking and traffic control.

The system may also use repeaters to communicate between two out of range drive controllers 50. The repeaters (not illustrated) pass information to a drive controller that is not in range of any other drive controller. The repeaters are particularly useful in manufacturing operations where some drive controllers may be in one room and others in another room wherein at least one of the rooms is shielded. The repeaters also allow the drive controllers to be spaced further apart, thereby requiring fewer drive controllers, which are relatively more expensive than repeaters. Other examples of where repeaters are useful would be the entrance and exits of tunnels, to allow reliable communication between drive controllers in the tunnel and drive controllers outside the tunnel.

The system also may report to a central controller or management information system which displays status, logs and event records of the system as well as in some circumstances status of manufacturing operations and machines. This allows for easy visualization of the status of the system, such as the location of the carriers, where the carriers are going and the operations being performed at each location.

The system may incorporate various safety measures related to operation of the system. For example, when a drive controller 50 determines that it is no longer in wireless communication with any drive controllers or repeaters, it may be programmed to stop the associated friction drives. The system may also shut completely down after determining that a particular drive controller has not been in wireless communication for a specified time period. This safety shutdown prevents jams and other problems if a single drive controller shuts down while the rest of the system continues to operate. The drive controllers may listen for a signal, such as a heartbeat signal or timed interval signal from nearby drive controllers to ensure wireless communication exists with at least one other drive controller, and preferably at least two other drive controllers.

Another potential safety measure is the use of a token, signal or code passed from an originating drive controller, through every other drive controller and back to the original or central controller to determine that all drive controllers are in contact. One way to pass the token would be in series between the drive controllers, but another way would be for each drive controller to modify, or add to the token, such that the last receiving drive controller or central controller can read and determine that each and every drive controller received and passed along the token. These tokens or heartbeats may be sent at specified intervals. The system may also be wired with a power shut off that shuts off the power to all drive controllers and friction drives.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A friction drive conveyor system comprising:
   a conveyor path;
   a first friction drive in electrical communication with a first drive controller; and
   a second friction drive in electrical communication with a second drive controller and wherein said first and second drive controllers are in wireless communication.

2. The friction drive conveyor system of claim 1 further including a central controller and wherein each of said first and second drive controllers are in wireless communication with said central controller.

3. The friction drive system of claim 1 further including a central controller and wherein said first drive controller is in direct wireless communication with said central controller and wherein said second drive controller is not in direct wireless communication with said central controller.

4. The friction drive system of claim 3 wherein said second drive controller and said central controller communicate through said first drive controller.

5. The friction drive system of claim 1 wherein said first drive controller is in electrical communication with additional friction drives.

6. The friction drive system of claim 1 further including a third drive controller and a repeater and wherein said third drive controller only communicates wirelessly with one of said first and second drive controllers through said repeater.

7. The friction drive system of claim 1 wherein said first drive controller is in communication with a first sensor and said second drive controller is in communication with a second sensor.

8. The friction drive system of claim 6 wherein said first and second sensors are tag readers.

9. The friction drive system of claim 8 further including a workpiece carrier having a unique tag and wherein said tag reader obtains identification information from said unique tag on said workpiece carrier.

10. The friction drive system of claim 1 further including a sensor in communication with at least one of said first and second drive controllers and a carrier configured to travel along said conveyor path and wherein said conveyor includes a tag capable of storing data and wherein said sensor is capable of reading said data on said tag and writing new data to said tag.

11. The friction drive system of claim 1 wherein each of said first and second drive controllers include a transceiver system capable of receiving and sending wireless signals.

12. The friction drive system of claim 11 wherein each of said drive controllers is capable of communicating wirelessly with manufacturing and process machines and devices.

13. The friction drive system of claim 1 wherein each of said first and second drive controllers is capable of controlling the run, stop and speed conditions of the associated first and second friction drives.

14. The friction drive system of claim 1 wherein one of said first and second drive controllers passes a wireless token to the other of said first and second drive controllers at specified time intervals.

15. The friction drive system of claim 14 wherein the other of said first and second drive controllers stops operation of the associated first or second friction drive if said token is not received within said specified time interval.

16. A friction drive conveyor system comprising:
   a conveyor path;
   a first friction drive in electrical communication with a first drive controller on said conveyor path;
   a second friction drive in electrical communication with a second drive controller on said conveyor path; and
   a plurality of intervening friction drives and a plurality of associated intervening drive controllers and wherein said first and second drive controllers are in wireless communication with said plurality of wireless controllers and said first and second drive controllers are only in communication with each other through said plurality of intervening drive controllers.

17. The friction drive system of claim 16 further including a central controller and wherein at least one of said first and second drive controllers are in wireless communication with said central controller.

18. The friction drive system of claim 17 wherein a portion of said plurality of intervening drive controllers and said second drive controller are not in direct wireless communication with said central controller.

19. The friction drive system of claim 18 wherein said portion of said plurality of intervening drive controllers and said second drive controller only communicate with said central controller through said first drive controller.

20. The friction drive system of claim 16 wherein at least one drive controller of said plurality of drive controllers communicates with the other of said plurality of intervening drive controllers only through a repeater.

21. The friction drive system of claim 16 wherein at least one drive controller is associated with more than one friction drive.

22. The friction drive system of claim 16 wherein at least one of said first and second drive controllers is in direct electrical communication with a central controller.

\* \* \* \* \*